United States Patent [19]
Selby

[11] Patent Number: 5,972,081
[45] Date of Patent: Oct. 26, 1999

[54] NEGLIGIBLE PRESSURE DROP ABSORBER

[76] Inventor: Theodore W. Selby, 4402 Arbor Dr., Midland, Mich. 48640

[21] Appl. No.: 09/040,009

[22] Filed: Mar. 17, 1998

[51] Int. Cl.$^6$ .................................................. B01D 53/04
[52] U.S. Cl. ................................ 96/131; 55/333; 55/520; 96/132; 96/134
[58] Field of Search ........................... 96/108, 121, 131, 96/132, 134, 147; 55/520, 333

[56] References Cited

U.S. PATENT DOCUMENTS

| | | | |
|---|---|---|---|
| 2,746,562 | 5/1956 | Ryall | 55/333 |
| 3,006,480 | 10/1961 | Russell | 55/520 |
| 3,037,637 | 6/1962 | Bub | 210/487 |
| 3,085,381 | 4/1963 | Sobeck | 55/333 |
| 3,323,963 | 6/1967 | Summers | 156/192 |
| 3,733,792 | 5/1973 | Taylor | 55/488 |
| 4,092,246 | 5/1978 | Kummer | 55/520 |
| 4,294,599 | 10/1981 | Grovesteen et al. | 55/520 |
| 4,668,393 | 5/1987 | Stone | 210/304 |
| 4,692,175 | 9/1987 | Frantz | 55/333 |
| 4,877,527 | 10/1989 | Brownell | 210/489 |
| 4,938,869 | 7/1990 | Bayerlein et al. | 210/437 |
| 5,096,591 | 3/1992 | Benn | 210/651 |
| 5,152,892 | 10/1992 | Chambers | 210/493.4 |
| 5,207,930 | 5/1993 | Kannan | 210/791 |
| 5,405,422 | 4/1995 | Ueda et al. | 55/267 |
| 5,456,069 | 10/1995 | Haerle | 55/498 |
| 5,460,721 | 10/1995 | Goodwin | 210/494.1 |
| 5,487,869 | 1/1996 | Retallick | 422/22 |
| 5,618,501 | 4/1997 | Wieres et al. | 422/180 |
| 5,630,855 | 5/1997 | Lundback | 55/332 |
| 5,660,606 | 8/1997 | Adamini | 55/337 |
| 5,667,302 | 9/1997 | Selby et al. | 374/54 |
| 5,679,251 | 10/1997 | Swanson et al. | 210/437 |
| 5,692,832 | 12/1997 | Selby | 374/54 |

OTHER PUBLICATIONS

U.S. application Ser. No. 08/425,588, Selby et al. Apr. 20,1995.

U.S. application Ser. No. 08/893,632, Selby et al. Jul. 11,1997.

*Primary Examiner*—Duane S. Smith
*Attorney, Agent, or Firm*—Christopher John Rudy

[57] ABSTRACT

Negligible pressure drop absorber has a hollow housing having an entrance opening and an exit opening, and an absorber unit including a plurality of layers of an absorbent material arranged substantially parallel with one another to form a passageway for a gaseous stream, through which the gaseous stream is adapted to travel and by which gaseous liquid and liquid droplets are absorbed from the gaseous stream with a negligible drop in pressure. In particular, in the testing of engine oils with a Noack-type teat device, added collection by absorbing drawn over sample is accomplished, with the ability to evaluate that sample, and without incurring a pressure drop in the system adverse thereto.

10 Claims, 1 Drawing Sheet

NEGLIGIBLE PRESSURE DROP ABSORBER

BACKGROUND TO THE INVENTION

I. Field of the Invention

The present invention concerns an absorber for a gas stream in a conduit, which can absorb a gaseous liquid and/or liquid droplets carried by the stream. Pressure of the stream drops negligibly with the absorber. In particular embodiments, the absorber is employed under low stream pressure and especially in Noack-type test devices.

II. Description of Known Art

In recently developed volatilization and collection art, engine oil samples are analyzed with precision by employment of a controlled flow rate and volume carrier gas stream, typically with the stream drawn over or about the sample under influence of a vacuum pump. See, Selby et al., U.S. patent application Ser. No. 06/425,588; Selby, U.S. Pat. No. 5,692,832; Selby et al., U.S. Pat. No. 5,667,302; and Selby, U.S. patent application Ser. No. 08/893,632—each of these four documents incorporated by reference herein. The SELBY-NOACK VOLATILITY (S-N-V or SNV) test device, accordingly, was developed and has been made commercially available by and from Tannas Co., Midland, Mich., U.S.A., in order to conveniently and efficiently carry out such testing.

However, it was recognized in early prototypical SNV devices that minor amounts of sample were carried by the air carrier gas out of the glassware past the collection flask. These amounts of sample were lost and pulled toward the vacuum pump. It would be desirable to overcome such drawbacks, keeping in mind, however, that the aforementioned volatilization and collection testing employs a consistent, precise flow of the carrier gas.

In many arts, various filters and so forth are known:

In one type of air filter, illustrated in present FIG. 1, radially disposed hollow housing 1 has entrance 2 and exit 3. Between the openings 2 & 3, hollow flattened cylindrical housing expansion 4 is provided in which sheets of filter paper 5 reside. Air passes through the filter paper so as to trap contaminants.

Swanson et al., U.S. Pat. No. 5,679,251, discloses a wound oil filter, which is for removal of soot from a diesel engine. A liquid oil stream passes through the filter.

Adamini, U.S. Pat. No. 5,660,606, discloses an inflator filter for producing helical gas flow, which is for employment in inflatable safety restraint systems. Flow is by tortuous path.

Wieres et al., U.S. Pat. No. 5,618,501, discloses a catalytic converter with, two or more honeycomb bodies in a casing tube and method for its production. It is a reactor, used in particular to clean exhaust gases of internal combustion engines.

Retallick, U.S. Pat. No. 5,487,969, discloses an air cleaner capable of catalytic regeneration. It is a dual system spirally wound device for capturing, catalytically converting and burning trapped hydrocarbons, used in spacecraft or submarines.

Goodwin, U.S. Pat. No. 5,460.721, discloses a helical wound tube. It has radial flow outward through a filter pack.

Haerle, U.S. Pat. No. 5,456,069, discloses an exhaust gas filter. It filters combustion engine exhaust, employing a tortuous path.

Ueda et al., U.S. Pat. No. 5,405,422, discloses a self-heating filter. It also employs a tortuous path.

Kannan, U.S. Pat. No. 5,207,930, discloses a filtration system with helical filter cartridge. It filters particulates from a liquid.

Chambers, U.S. Pat. No. 5,152,892, discloses a spiral filter element. It employs a spring and filters particulates.

Benn, U.S. Pat. No. 5,096,591, discloses a spirally wound filter cartridge, apparatus system and method of use and manufacture. It employs passage through a membrane sheet.

Bayerlein et al., U.S. Pat. No. 4,938,869, discloses a spiral wound filter element. It filters particles from fluid which passes radially through the filter element.

Brownell, U.S. Pat. No. 4,877,527, discloses a liquid filter of spiral wound construction with alternate layers of surface area media and a depth media. Radial and circumferential flow is employed.

Stone, U.S. Pat. No. 4,668,393, discloses a semipermeable baffle fuel filter. Liquid fuels may pass radially inwardly or outwardly through spiral flights of filter media disposed adjacent an open circuitous spiral channel with baffle.

Taylor, U.S. Pat. No. 3,733,792, discloses filters. It concerns filtering of blanket gas in sodium-cooled nuclear reactors, and includes ai knitted wire mesh with a surface of a material not wetted by the aerosol, rolled in layers a spiral.

Summers, U.S. Pat. No. 3,323,963, discloses a method of making filter coil. A tortuous passage filter results, and the filtering is carried out through walls of the passages.

Bub, U.S. Pat. No. 3,037,637, discloses a spiral roll filter unit. Passage is through the filter element.

In addition, the following U.S. patents are cited herein:

Ryall, U.S. Pat. No. 2,746,562. This discloses a device for removing liquid and liquefiable vapors from gas.

Russell, U.S. Pat. No. 3,006,480. This discloses a gathered sock oil filter.

Sobeck, U.S. Pat. No. 3,085,381. This discloses a two-stage oil separator.

Kummer, U.S. Pat. No. 4,092,246. This discloses a helically wound blood filter.

Grovesteen et al., U.S. Pat. No. 4,294,599. This discloses an aerosol filter cartridge.

Frantz, U.S. Pat. No. 4,692,175. This discloses a two-stage precoalescer unit.

Lundback, U.S. Pat. No. 5,630,855. This discloses a moisture-collection device.

SUMMARY OF THE INVENTION

The present invention provides a negligible pressure drop absorber comprising a hollow housing having an entrance opening and an exit opening, and an absorber unit including a plurality of layers of an absorbent material arranged substantially parallel with one another to form a passageway for a gaseous stream, through which the o stream is adapted to travel and by which gaseous liquid and/or liquid droplets are absorbed from the gaseous stream with a negligible drop in pressure. Brownian motion of the gaseous liquid and/or liquid droplets can bring the same into contact with the absorber unit to be absorbed thereby.

The invention is useful in removing liquids from an aerosol.

Significantly, by the invention, a negligible pressure drop absorber is provided. In particular, in the testing of engine oils with a Noack-type test device, for example, the SNV device, added collection by absorbing drawn over sample is accomplished, with the ability to evaluate that sample, and without incurring a pressure drop in the system adverse thereto. It may be said, in general, that the invention is not a conventional filter.

Numerous further advantages attend the invention.

DRAWINGS IN BRIEF

The drawings form part of the specification hereof. In the drawings, the following in noted:

Figure 4:
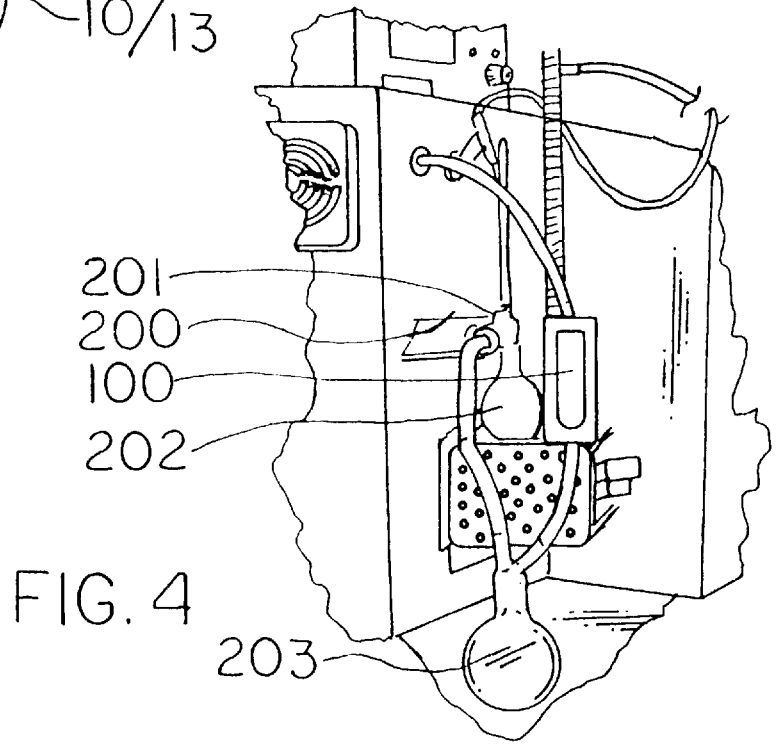

FIG. 4 in a plan of the absorber in a SELBY-NOACK device.

ILLUSTRATIVE DETAIL

The invention can be further understood by the present detail which may be read in view of the drawings. The same is to be taken in an illustrative and not necessarily limiting sense.

Figure 1:
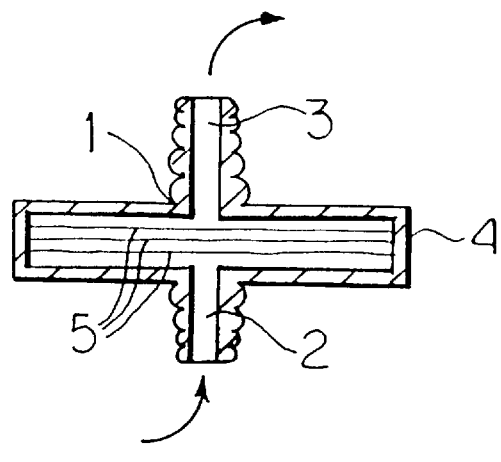
FIG. 1 is a side, cut away view of a filter of the prior art.
Figure 2:
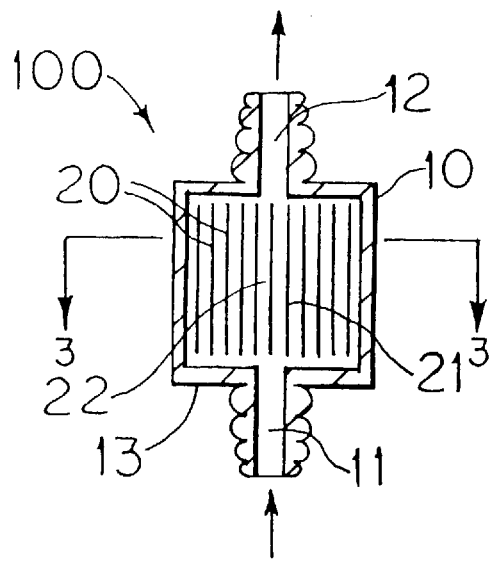
FIG. 2 is a side, cut away view of an embodiment of a negligible pressure drop absorber of the invention.
Figure 3:
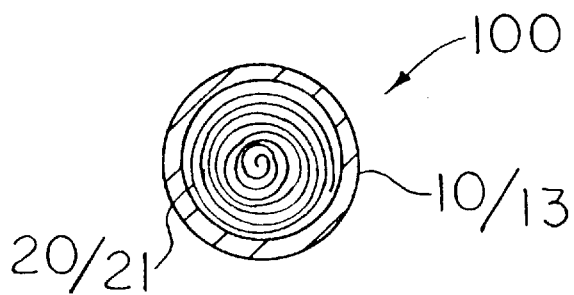
FIG. 3 is a top, sectional view, taken along 3—3.

With reference to the drawings of the invention, FIGS. 2 & 3, negligible pressure drop absorber 100 has hollow housing 10 which includes entrance opening 11 and exit opening 12. The housing 10 can be made of any suitable material, to include metal, plastic or glass, far example, being made of a laboratory grade glass, which has a ground glass joint female adapter as the entrance opening 11 and a plastic tube connection as the exit opening 12. The housing 10 may be cylindrical, and have an optional, radially symmetrical, generally symmetrical bulge 13. Alternatively, the housing may have an elliptical, rectangular, square, triangular or other suitable shape, viewed cross-sectionally, perpendicular to the axis of flow of carrier gas through the housing.

Absorber unit 20 includes a plurality of layers of absorbent material 21 arranged substantially parallel with one another to form passageway 22 for the gaseous stream. The gaseous stream is adapted to travel through passageway(s) 22 of the unit 20. The passageway(s) 22 are substantially straight and open so that the carrier gas flows freely therethrough. Liquid is absorbed by the unit 20 from the gaseous stream—with a negligible drop in gas pressure. Without wishing necessarily to be bound thereby, it is theorized that Brownian motion of the liquid in the aerosol plays a significant part in allowing the liquid to be brought into contact with the absorbent material 21 to be trapped therewith while the carrier gas flows unimpeeded through the passageways 22. The absorbent material 21 can be made of any suitable material, to include paper, textiles, mineral fiber, and so forth, for example, being made of a paper towel type absorbent paper. The unit 20 can be provided in any suitable shape or arrangement, provided that the same does not interfere with the desired flow of gas in the gaseous stream. Accordingly, parallel individual sheets of the absorbent material 21 may be arranged in parallel to form the passageway(s) 22. A preferred arrangement of the absorbent material 21 is a helix.

The size of the device 100 and its component parts may vary. For instance, the housing 10 may have a 2–4-inch length and ½–1-inch circumference. The unit 20 may have spirally wound absorbent paper of about 1½-inch length and ½-inch diameter.

In reference to FIG. 4, in testing of engine oils with the SELBY-NOACK VOLATILITY device 200, a vacuum pump draws the carrier gas inside test equipment 201 at a fairly low, constant rate over sample in sample evolution vessel 202, and so forth. Preferably, the invention 100 is hooked up to a conduit leading from liquid sample collection vessel 203 to the vacuum pump, typically just after the carrier gas stream would exit the vessel 203. Alternatively, the vessel 202 can be modified to itself contain the housing 10 and absorbing unit 20 of the invention 100. In use, liquid oleaginous matter or engine oil additives are trapped by the unit 20, with the liquid appearing on the absorbent material 21 closest to the sample collection vessel 203, and, as the material becomes filled up or saturated with the liquid, further and further away therefrom. The trapped liquid is thus collected in addition to that found in the collection vessel 203, and the trapped liquid sample, in addition to that found in the sample collection vessel 203, can be analyzed, for example, by weight, elemental composition, spectrophotometry, and so forth and the like. Moreover, the characteristic critical flow of the test protocol thus can he preserved.

CONCLUSION

The present invention is thus provided. Numerous modifications can be effected within its spirit, the literal claim scope of which is particularly pointed out as follows:

I claim:

1. A negligible pressure drop absorber device for removing at least one of a gaseous liquid and liquid droplets from a flowing gaseous stream which stream includes a carrier gas and at least one of the gaseous liquid and the liquid droplets therein, which device comprises a hollow housing having an entrance opening and an exit opening, and, enclosed in said housing and positioned between said entrance and exit openings, an absorber unit including a plurality of layers of absorbent material arranged substantially parallel with one another to form a passageway for the gaseous stream, through which passageway the gaseous stream can travel parallel to and between said layers of the absorbent material and by which at least one of the gaseous liquid and the liquid droplets can be absorbed from the gaseous stream by allowing at least one of the gaseous liquid and the liquid droplets in the gaseous stream to be brought into contact with said layers of absorbent material to be trapped therewith while the carrier gas flows unimpeded through said passageway with a negligible drop in pressure from said entrance opening to said exit opening.

2. The absorber device of claim 1, wherein the plurality of layers of absorbent material is provided by a helical arrangement wound around a central axis parallel to the flow of the gaseous stream.

3. The absorber device of claim 2, wherein the absorbent material of the absorber unit is a paper.

4. The absorber device of claim 1, wherein said housing is made of glass.

5. The absorber device of claim 3, wherein said housing is made of glass.

6. In a test apparatus useful for volatilization and collection testing of an engine oil sample having a sample evolution vessel, a sample collection vessel, and a passageway therebetween through which a carrier gas can travel, drawn by a vacuum pump, the improvement which comprises providing in line after the sample collection vessel but before the vacuum pump, a negligible pressure drop absorber device for removing at least one of a gaseous liquid and liquid droplets originating with the engine oil sample from a flowing gaseous stream which stream includes the carrier gas and at least one of said gaseous liquid and liquid droplets therein, which device includes a hollow housing having an entrance opening and an exit opening, and, enclosed in said housing and positioned between said entrance and exit openings, an absorber unit including a plurality of layers of absorbent material arranged substantially parallel with one another to form a passageway for the gaseous stream, through which passageway the gaseous stream can travel parallel to and between said layers of the absorbent material and by which at least one of said gaseous liquid and liquid droplets can be absorbed from the gaseous stream by allowing at least one of said gaseous liquid and liquid droplets in the gaseous stream to be brought into contact with said layers of absorbent material to be trapped therewith while the carrier gas flows unimpeded through said passageway with a negligible drop in pressure from said entrance opening to said exit opening.

7. The absorber device of claim 6, wherein the plurality of layers of absorbent material is provided by a helical arrangement wound around a central axis parallel to the flow of the gaseous stream.

8. The absorber device of claim 7, wherein the absorbent material of the absorber unit is a paper.

9. The absorber device of claim 6, wherein said housing is made of glass.

10. The absorber device of claim 8, wherein said housing is made of glass.

\* \* \* \* \*